United States Patent [19]

Cronje

[11] Patent Number: 4,912,256

[45] Date of Patent: Mar. 27, 1990

[54] PROCESS FOR THE OXIDATION OF FINE COAL

[75] Inventor: Izak J. Cronje, Transvaal, South Africa

[73] Assignee: National Energy Council, Pretoria, South Africa

[21] Appl. No.: 216,223

[22] Filed: Jul. 7, 1988

[30] Foreign Application Priority Data

Jul. 8, 1987 [ZA] South Africa ...................... 87/4966

[51] Int. Cl.⁴ ............................................. C07C 59/00
[52] U.S. Cl. .................................... 562/465; 562/475; 562/478
[58] Field of Search ........................ 562/465, 475, 478

[56] References Cited

U.S. PATENT DOCUMENTS 4,788,360 11/1988 Calemma et al. ................... 562/465

Primary Examiner—Paul J. Killos

Attorney, Agent, or Firm—Cushman, Darby & Cushman

[57] ABSTRACT

This invention relates to the production of a solid oxidized coal containing humic acids. Coal with a mean particle size of less than 3 mm is slurried with water and then oxidized with oxygen or mixtures of oxygen and air at temperatures ranging from 100° to 300° C., at partial oxygen pressures ranging from 0,1 to 10 MPa and reaction periods ranging from 5 to 600 minutes. In the absence of catalysts, e.g. alkaline bases, the main product of oxidation is humic acids. These humic acids are not dissolved because the pH of this slurry is in the range 4 to 9. Small amount of fulvic acids are formed and these are soluble in the water of the slurry.

The coal-derived humic acids may for example find application as soil conditioners, organic fertilisers, briquette and pellet binders, drilling fluid dispersants and viscosity control agents, while the coal-derived fulvic acids may be utilized for the production of fuel extenders, plasticizers and petrochemicals.

13 Claims, 1 Drawing Sheet

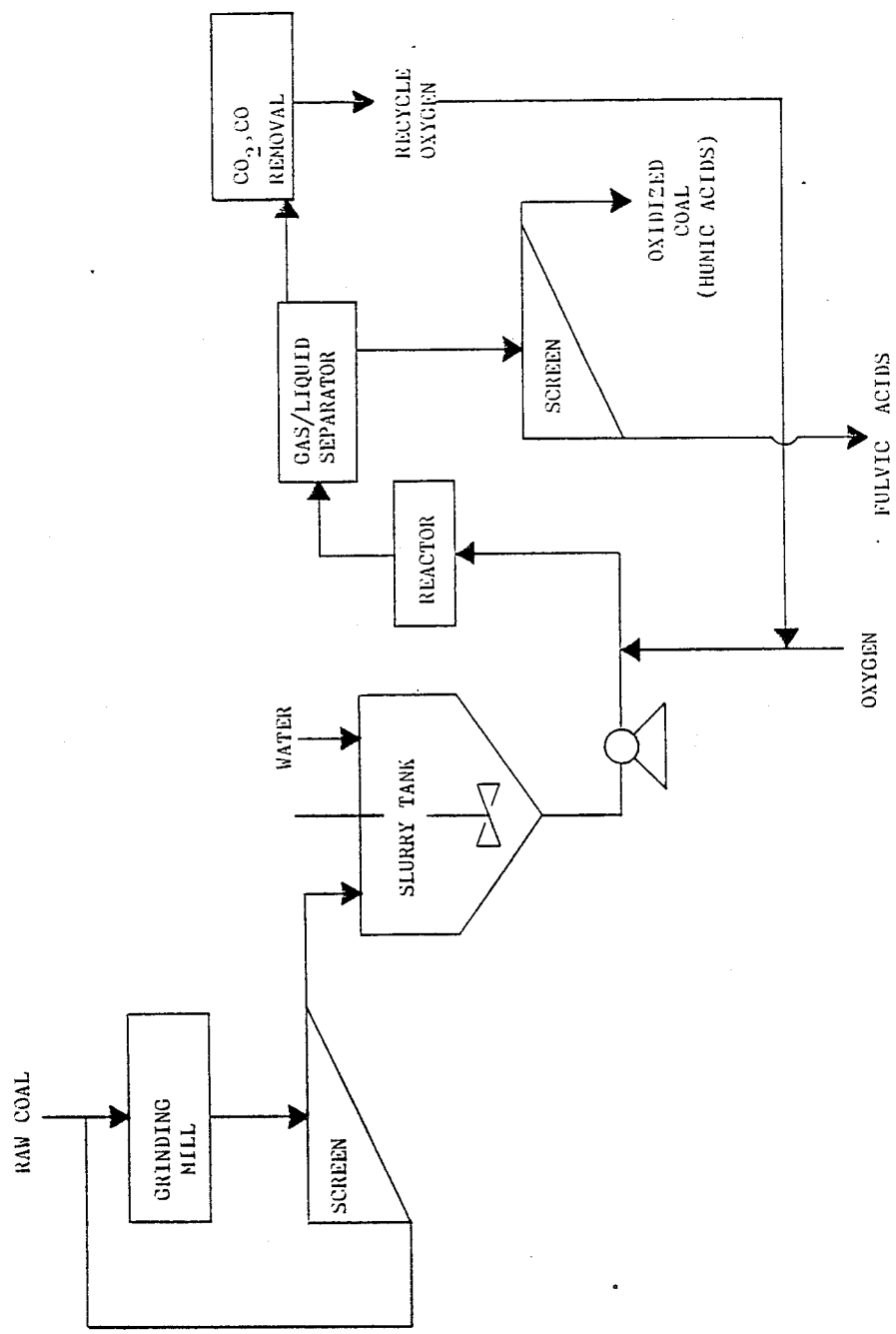

PROCESS FOR THE OXIDATION OF FINE COAL

BACKGROUND OF THE INVENTION

This invention relates to a process for the oxidation of coal.

Various oxidation routes for the production of humic and/or fulvic acids from coal have been discussed in the literature. For example, oxidation with nitric acid or nitrogen oxides is discussed and described in British patent 1,283,385. Further, oxidation of coal with oxygen in an aqueous alkaline phase is described in the United States Bureau Mines Internal Circular, No. 8234, 1963, pages 74 to 99. The process of this latter reference involves slurrying particulate coal with a dilute caustic solution and then oxidising with gaseous oxygen under elevated temperature and pressure conditions. The pH of the slurry will be very high and at least 12 or higher. Under these conditions, the acids which will be produced will be both humic and fulvic acids with the fulvic acids constituting a high percentage. Both these acids are soluble in solutions of this high pH. The general shortcomings of these liquid medium routes are high consumption of expensive reagents, e.g. alkali, poor product selectivity and long reactiion times.

Friedman and Kinney (Ind. Eng. Cham. 42, 2525 [1950]) studied the fixed-bed air-oxidation of coals ranging from lignite to low volatile bituminous coals, achieving humic acid yields of up to 96,5%. This approach is however hampered by serious spontaneous combustion problems which disqualifies such "dry" air-oxidation processes for commercial application.

SUMMARY OF THE INVENTION

According to the invention a process for producing a solid oxidised coal containing humic acids includes the steps of:

(a) mixing coal with an aqueous medium to produce a slurry having a pH in the range 4 to 9;

(b) reacting the slurry with a gaseous oxidant selected from oxygen, air and mixtures thereof under conditions of temperature and pressure and for a time to cause the oxidation of the coal thereby producing oxidised coal containing humic acids; and (c) separating the oxidised coal containing humic acids from the aqueous medium.

DESCRIPTION OF THE DRAWING

The accompanying DRAWING illustrates a flow diagram of an embodiment of the invention.

DETAILED DESCRIPTION OF THE INVENTION

The product which is produced by the process of the invention is a solid oxidised coal which contains humic acids. In the process, some fulvic acids will also be produced. Fulvic acids are soluble in aqueous mediums of pH in the range 4 to 9 and will therefore not be present in the separated oxidised coal except in trace amounts. The pH of the slurry will depend to a large extent on the nature of the coal which is being oxidised. The aqueous medium may contain a buffer but otherwise no expensive reagents such as alkali as are necessary in the liquid medium oxidation processes mentioned above need to be used.

The humic acids are not soluble in aqueous mediums of pH in the range 4 to 9. Consequently, the invention results in a high proportion of humic acids and only a very small proportion of fulvic acids being produced. The humic acids are trapped in the separated oxidised coal and may easily be separated therefrom by treating the oxidised coal with a strong alkali solution, e.g. having a pH of 12 or higher and separating the solid oxidised coal from the alkali solution which now contains the humic acids in dissolved form. Examples of suitable alkali solutions are sodium hydroxide and ammonium hydroxide solutions.

In the oxidised coal the major oxidation product will be humic acids. The oxidised coal will also contain minor quantities of other oxidation products as well as unreacted materials such as ash.

The fulvic acids may be recovered from the separated aqueous medium by extraction with a suitable organic solvent such as butanone.

The slurry will have a pH in the range 4 to 9. Preferably, the slurry will have a pH in the range 6 to 8, more preferably a pH of about 7.

The slurry preferably has a solids content, i.e. a content of coal particles, in the range 5 to 70% by weight of the slurry. More preferably, the slurry has a solids content in the range 10 to 60% by weight of the slurry.

The coal will typically be a coal with a rank ranging from lignite to low volatile bituminous.

The mean particle size of the coal will normally be less than 3 mm. Preferably the mean particle size of the coal varies in the range 10 to 1000 microns. More preferably, the coal will have a mean particle size in the range 10 to 100 microns. Thus, the invention has particular, but not exclusive, application to fine coals.

The second step of the process of the invention involves reacting the slurry with a gaseous oxidant which is oxygen or air or a mixture of oxygen and air under suitable conditions of temperature and pressure and for a time sufficient to produce the oxidised product in acceptable yields.

The reaction is preferably carried out in a pressurised reactor system equipped with a suitable distributor or stirring mechanism to ensure effective mass and heat transfer between the gaseous, liquid and solid phases.

The oxidation step is preferably carried out at an elevated temperature in the range 100° C. to 300° C. The preferred temperature within this range is influenced by the chemical and physical properties of the coal, and other parameters, e.g. slurry concentration and pressure.

The oxidation step is preferably carried out under elevated pressure which is sufficient to ensure substantial oxidation of the coal. Different types of coal, i.e. coal with different reactivities will require different pressures. Suitable pressures (at the elevated temperature) are oxygen partial pressures in the range 0,1 to 10 MPa, more preferably 2 to 8 MPa. Most preferably, the oxidation step is carried out at an oxygen partial pressure of approximately 3 to 4 MPa.

The oxidation step is continued for a period of time sufficient to produce the product quantity and quality required. Generally, the oxidation step will be carried out for a period of between 5 and 600 minutes, more preferably between 20 and 60 minutes, depending on the coal reactivity and the applied reaction conditions. Generally, oxidation times in excess of 60 minutes will not be necessary. This represents a significant advantage over the "dry"air-oxidation methods described above where much longer oxidation times are necessary.

The coal-derived humic acids may, for example, find application as soil conditioners, organic fertilisers, briquette and pellet binders, drilling fluid dispersants and viscosity control agents, whilst the coal-derived fulvic acids may be utilised for the production of fuel extenders, plasticisers and petrochemicals.

The process of the invention has a number of advantages over the caustic medium oxidation processes and "dry" air-oxidation processes mentioned above. These advantages are:

In relation to caustic medium oxidation processes:
No expensive reagents or catalysts are needed.
High humic acids yields and selectivity are achieved.
In relation to "dry" air-oxidation processes:
The water-soluble fulvic acids are readily separated from the insoluble oxidised coal containing up to 88% (on a carbon basis) alkali-soluble humic acids.

Ease of temperature control. No run-aways are experienced compared to dry air-oxidation (packed bed, stirred or fluidised-bed conditions).

High concentrations of coal water slurries can be used, i.e. high coal throughput per reactor volume unit is achieved.

Short reaction periods for high coal conversions are achieved by applying increased partial oxygen pressure. If pure oxygen is used as oxidant, unspent oxygen in the product gas can be recovered and recycled after removal of the carbon dioxide (major component) and carbon monoxide (minor component) formed in the oxidation process.

The process can be carried out in a bath or continuous mode. In the case of a continuous operation sufficient heat is generated by the oxidation process to heat fresh slurry feed and oxygen from room temperature to the required reaction temperature.

An embodiment of the invention will now be described with reference to the attached flow diagram. Referring to this diagram, raw coal is milled and then screened to remover oversize particles. The milled product is delivered to a slurry tank where water is added to produce the slurry. The slurry is delivered to a reactor where the oxidation takes place. After the oxidation has been completed, the gas is removed in a gas/liquid separator. This gas contains oxygen, carbon dioxide and carbon monoxide. The carbon dioxide and carbon monoxide are removed from the gas and oxygen recycled to the reactor. The solid oxidised coal containing humic acids and the aqueous medium containing the dissolved fulvic acids are delivered to a screening step where the oxidised coal conatining humic acids is removed by filtration from the aqueous medium containing the fulvic acids.

The invention is further illustrated by the following Examples.

EXAMPLE 1

800 g of a South African bituminous coal (analysis in Table 1) with a mean particle size of 10 microns was slurried in 1000 ml water and quantitatively transferred to an autoclave of 1800 ml capacity, and equipped with a stirrer and a cooling coil. The stirrer and heater were started simultaneously, while a constant flow (5 liter per minute, ambient conditions) of pressurised oxygen (4 MPa) was passed through the slurry. The temperature was controlled at 200° C. +2° C. for a reaction period of one hour after which the reaction was terminated by passing cold water through the cooling coil.

The humic acids content of the oxidised coal, obtained by filtering the reaction mixture, was then determined as follows: 10 g of oxidised coal (analysis in Table 2), quantitatively transferred to a round bottom flask, was mixed with 10 g of sodium hydroxide pellets and refluxed for five hours after which the reaction mixture was cooled and centrifuged to separate the undissolved residue.

The residue was washed twice with 0,1N NaOH solution and twice with water. All the washings were added to the solution obtained after centrifuging. The residue was dried, weighed and the organic content determined.

The humic acids contained in the solution were recovered by precipitation, after acidification with hydrochloric acid to a pH value of 2. The now insoluble humic acids were centrifuged, washed with 0,1N HCl solution and water. After drying to constant mass the solid humic acids were weighed and analysed for organic content.

The fulvic acids were obtained by extracting with butanone the acidic solution and washings after saturating it with sodium sulphate. The butanone fraction was dried over anhydrous $Na_2SO_4$, filtered and evaporated to dryness. The material thus obtained was weighed and the organic content determined.

The results are given below:

| | |
|---|---|
| % oxidised coal recovered = | 66,1 |
| (on carbon basis, relating to daf raw coal) | |
| % humic acids recovered = | 87,4 |
| (on carbon basis, relating to oxidised coal) | |
| % fulvic acids recovered = | 3,7 |
| (on carbon basis, relating to daf raw coal) | |

"daf" = dry ash free.

TABLE 1
ANALYSIS OF SOUTH AFRICAN BITUMINOUS COAL

| Proximate and Ultimate Analysis | |
|---|---|
| $H_2O$ | 1,5% |
| Ash | 11,4% |
| Vol Mat | 34,1% |
| Fix Carb | 53,0% |
| % C | 69,81 |
| % H | 4,65 |
| % N | 1,80 |
| % S | 0,71 |
| % O | 10,36 |
| Petrographic Analysis | |
| Vitrinite | 84,9% |
| Exinite | 4,49% |
| Inertinite | 5,8% |
| Visible minerals | 4,9% |
| % ROV | 0,65 |

TABLE 2

| Analysis of Oxidised Coal | |
|---|---|
| % $H_2O$ | 12,1 |
| % Ash | 9,8 |
| Volatile Material | 35,6 |
| Fixed Carbon | 42,5 |
| % C | 51,10 |
| % H | 2,23 |
| % N | 1,42 |
| % S | 0,37 |
| % O | 22,98 |

EXAMPLE 2

The same reactor system was used as in Example 1. The reaction conditions were as follows:

| | |
|---|---|
| Coal particle size | −500 + 200 microns |
| Slurry used | 200 gm coal plus 400 ml water |
| Oxygen pressure | 3 MPa |
| Oxygen flowrate | 4 liters per minute |
| Temperature | 200° C. |
| Reaction period | 1 hour |

The results were as follows:

| | |
|---|---|
| % oxidised coal recovered = (on carbon basis, relating to daf raw coal) | 81,4 |
| % humic acids recovered = (on carbon basis, relating to oxidised coal) | 71,4 |
| % fulvic acids recovered = (on carbon basis, relating to daf raw coal) | 4,2 |

EXAMPLE 3

The same reactor system as in Example 1 was used except a slurry pump was connected to it in order to feed a coal slurry continuously. The reaction conditions were as follows:

| | |
|---|---|
| Mean coal particle size | 10 microns |
| Slurry concentration | 15% |
| Slurry flowrate | 850 ml per hour |
| Oxygen pressure | 4 Mpa |
| Oxygen flowrate | 4 liters per minute |
| Temperature | 180° C. |
| Residence time | 1,5 hour |

The results were as follows:

| | |
|---|---|
| % oxidised coal recovered = (on carbon basis, relating to daf raw coal) | 60,9 |
| % humic acids recovered = (on carbon basis, relating to oxidised coal) | 63,4 |
| % fulvic acids recovered = (on carbon basis, relating to daf raw coal) | 4,1 |

I claim:

1. A process for producing a solid oxidised coal containing humic acids includes the steps of:
   (a) mixing coal with an aqueous medium to produce a slurry having a pH in the range 4 to 9;
   (b) reacting the slurry with a gaseous oxidant selected from oxygen, air and mixtures thereof under conditions of temperature and pressure and for a time to cause the oxidation of the coal thereby producing oxidized coal containing humic acids; and
   (c) separating the oxidised coal containing humic acids from the aqueous medium.

2. A process of claim 1 wherein the pH of the slurry is in the range 6 to 8.

3. A process of claim 1 wherein the pH of the slurry is about 7.

4. A process of claim 1 wherein the solids content of the slurry is in the range 5 to 70% by weight of the slurry.

5. A process of claim 1 wherein the solids content of the slurry is in the range 10 to 60% by weight of the slurry.

6. A process of claim 1 wherein the mean particle size of the coal is less than 3 mm.

7. A process of claim 1 wherein the mean particle size of the coal is in the range 10 to 1000 microns.

8. A process of claim 1 wherein the partial pressure of the oxygen in the gaseous oxidant is in the range 0,1 to 10 MPa.

9. A process of claim 1 wherein the temperature of oxidation is in the range 100° to 300° C.

10. A process of claim 1 wherein the oxidation is continued for a period of 5 to 600 minutes.

11. A process of claim 1 wherein the oxidation is continued for a period of 20 to 60 minutes.

12. A process for producing solid oxidised coal containing humic acids includes the steps of:
   (a) mixing coal of mean particle size less than 3 mm with an aqueous medium to produce a slurry having a pH in the range 4 and 9 and a solids content in the range 5 to 7% by weight of the slurry;
   (b) reacting the slurry with a gaseous oxidant selected from oxygen, air and mixtures thereof to cause the oxidation of the coal thereby producing oxidised coal containing humic acids, the partial pressure of oxygen in the gaseous oxidant being in the range 0,1 to 10 MPa, the temperature of oxidation being in the range 100° C. to 300° C. and the oxidation being continued for a period of 5 to 600 minutes; and
   (c) separating the oxidised coal containing humic acids from the aqueous medium.

13. A process of claim 12 wherein the oxidation is continued for a period of 20 to 60 minutes.

* * * * *